Figure 1:
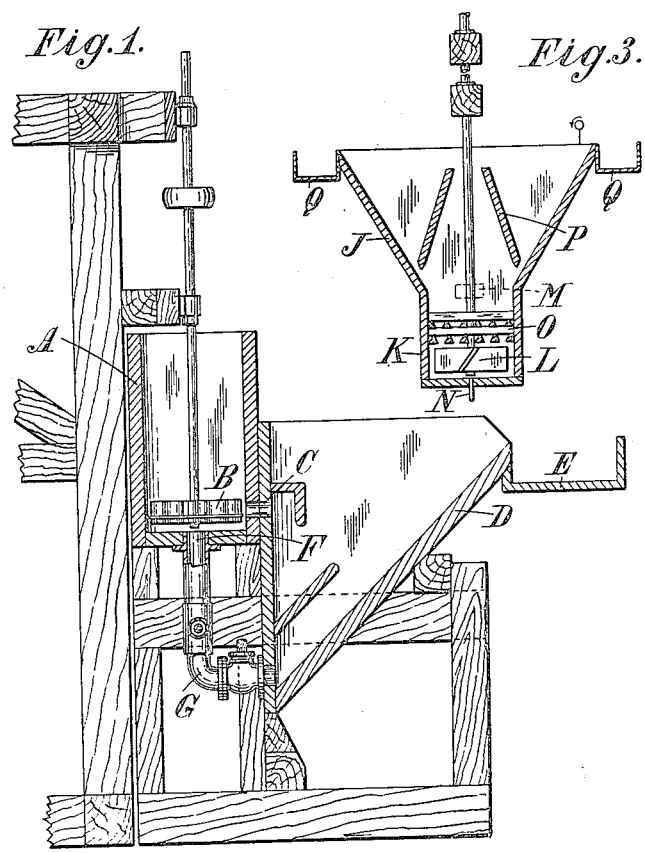

Patented Aug. 26, 1924.

1,505,944

UNITED STATES PATENT OFFICE.

WALTER BROADBRIDGE AND EDWIN EDSER, OF LONDON, ENGLAND, ASSIGNORS TO MINERALS SEPARATION LIMITED, OF LONDON, ENGLAND, A BRITISH LIMITED LIABILITY COMPANY.

TREATMENT OF EMULSIONS.

Application filed June 26, 1920. Serial No. 391,918.

*To all whom it may concern:*

Be it known that we, WALTER BROADBRIDGE and EDWIN EDSER, subjects of the King of England, and both residing at London, England, have invented certain new and useful Improvements in the Treatment of Emulsions, of which the following is a specification.

This invention relates to the treatment of emulsions, and has for its object to provide an improved process and apparatus for the separation and recovery of their constituents. The invention is particularly applicable to the recovery of wool-fat or lanoline from wool-washing effluent, and the expression emulsion is used to connote emulsions or suspensions of that type.

Various proposals have been made for the treatment of such emulsions by subjecting them to the action of air or other gas, in some cases forced into the liquid under pressure, or in the form of fine jets, so that the gas passes through the liquid in the form of bubbles, and it has also been suggested to assist the action by the employment of baffles in the containing vessel, (see British Patent No. 23741 of 1914).

According to this invention the process for the separation and recovery of the constituents of an emulsion comprises submitting the emulsion to agitation and to the action of a gas in the form of minute bubbles, under such conditions that there are formed therein a multitude of the minute bubbles characteristic of the froth-flotation separation process, in order that certain constituents of the mixture, by preferential attachment to the gaseous bubbles, may be carried to the surface in the form of a froth and removed. Preferably, this is effected by submitting the emulsion to agitation and aeration with air or other suitable gas as is employed in the well-known froth-flotation process of ore concentration. Frothing agents and modifying agents, for example amyl-alcohol, soap, or saponin, may be added to the emulsion as desired. In certain cases, for example, when the material under treatment already contains such an agent, this addition may not be necessary. The particular agent selected and the proportions in which it is added depend upon circumstances, such as the nature of the material under treatment, simple preliminary experiment sufficient to determine these points, as well as the best conditions of working, for instance in respect of temperature, in any given case.

The invention may be conveniently exemplified by its application to the separation of the fatty constituents of a wool-washing effluent, a product resulting from the process of degreasing wool with soap solution. This product frequently presents great difficulty of treatment, the separation of the fatty material by the known method of injecting air being often extremely slow. By the process of the present invention in which the air is disseminated throughout the agitated mass in a very finely divided state, the separation and recovery of the fatty material is readily accomplished.

It has been found that apparatus of the type used in mineral froth-flotation is particularly adapted for carrying the present invention into effect. In mineral-froth-flotation a mineral-frothing agent is an agent which, when added to an ore pulp, in the froth-flotation process, promotes the formation of a mineral-bearing froth, and in the present case a frothing agent is the agent which in a similar manner assists the production and dissemination of the finely divided gas throughout the emulsion and the preferential attachment of the gaseous bubbles to certain constituents.

The invention has been found specially advantageous in the treatment of certain obstinate emulsions, the constituents of which have presented great difficulty of separation.

In the emulsions that are treated according to this invention, a certain constituent, hereinafter called "values," is more readily attached to the minute air bubbles under certain conditions than are other constituents. Thus, in the wool-washing effluent, the values are the particles of wool-fat.

Exhaustive experiments have led to the following conclusions as to the determining factors of our process.

(a) We find that during the agitation of the emulsion with the minute air bubbles, the selection of the values is dependent inter alia on the extent of the air-liquid surface of the bubbles presented to the particles in suspension. For a given volume or mass of air this area varies inversely with the diameter of the bubbles, so that the available area is a maximum when the bubbles are most minute, and, according to this invention, the production of very minute bubbles is an essential.

(b) Further, we have found that the necessary subdivision of the air or other gas introduced is best effected by a mechanical agitation of such character and violence that the air is broken up as effectively as possible into minute bubbles. Preferably this mechanical agitation takes place at or near the bottom of the vessel containing the emulsion or liquid suspension.

(c) We find also that there is an important time factor in the gaseous selection; that is to say, when a minute air bubble is presented to the emulsion, an appreciable time is required for the values, such as wool-fat, to come out of the continuous liquid medium and become attached to the surface of the air bubbles.

A suitable form of mechanical agitation according to this invention is therefore one in which the gaseous bubbles, when formed, do not at once rise to the surface of the liquid but churn round and round (say in a horizontal zone) at the lower part of the vessel, whereby the gaseous bubbles get ample opportunity of being presented to the suspended particles and sufficient time is afforded for the required attachment to take place.

(d) It is desirable that the part of the apparatus in which the froth containing the values, such as wool-fat, is formed and comes to the surface, should be in a state of comparative rest.

It has been found that the best temperature for the operation is 25—30° C.

Figure 2:
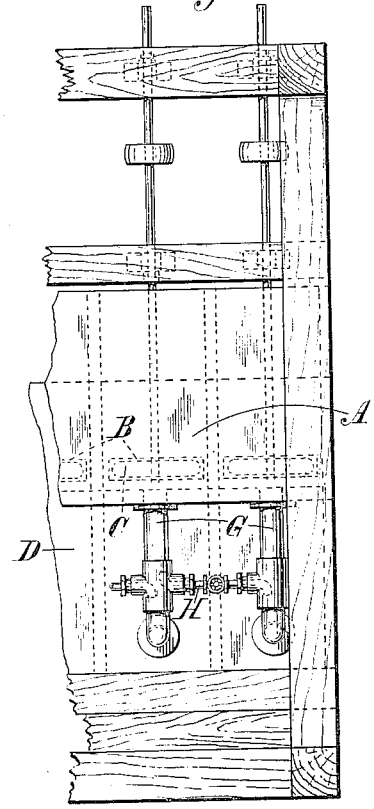

In the accompanying drawings which illustrate forms of apparatus suitable for carrying this invention into practice, Figure 1 is a diagrammatic central vertical transverse section through an agitation vessel and a spitzkasten of a standard froth-flotation apparatus, and Figure 2 is a rear elevation of the same apparatus showing the connections between the spitzkasten and agitation vessels;

Figure 3 is a diagrammatic vertical transverse section of a froth-flotation apparatus of the sub-aeration type, as described in British application No. 22370 of 1919.

Referring first to Figures 1 and 2, there is a series of agitation vessels and spitzkasten side by side, and each agitation vessel A is provided with an agitator B of the type shown in Figure 2 of United States Patent No. 1,084,210, and communicates through outlet C with spitzkasten D, from the surface of which the froth overflows into launder E. In order that the objects of paragraph (c) above may be adequately achieved, the bottom of the spitzkasten D is connected with the inlet F at the centre of the bottom of the agitation vessel A through a conduit G, and in order that a due proportion of the liquid may be passed forward to the next agitation vessel in the series, there is disposed in the conduit G a pipe H with its end curved downward to lie directly in the path of the circulating liquid and to by-pass a proportion thereof into the next conduit G which connects the next spitzkasten with the next agitation vessel in the series.

The operation may be continuous. In the case of wool-washing effluent, the material is introduced into the vessel, agitation is commenced, and air is introduced thereby in the well-known way. The effluent, in its agitated and aerated condition, passes into the spitzkasten. A proportion thereof is drawn back into the agitation vessel through the conduit G for further agitation and aeration, and a proportion passes on to the next agitation vessel and spitzkasten. A coherent froth, which is charged with wool-fat, overflows from each spitzkasten into the launder E.

Referring to Figure 3, the apparatus is of the general type set out in United States Patent No. 1,155,815 employing a vessel having an inlet for the liquid under treatment, an outlet for the residues, an inlet conduit for air or other gas near the bottom of said vessel, means for producing a zone of violent agitation and aeration near the bottom of the vessel, means for producing a comparatively quiet zone near the top of the vessel where the froth forms, and means for separating the froth. In this case again, there is a series of agitation vessels. Each vessel J has a lower portion K (which provides the zone of violent agitation), having a horizontal rotatable agitator L mounted on a vertical rotatable spindle at the bottom of the vessel. An inlet M is provided for the liquid to be treated and a corresponding outlet to the next vessel. There also is an air inlet pipe N leading to the centre of the bottom of the vessel.

Immediately above the agitator L is arranged a grid O which conveniently consists of several, say four or six, series of horizontal bars which extend across the vessel in close proximity to one another, alternate series being at right-angles to one another and the parallel series being staggered in relation to one another. The object of the arrangements at the bottom of the vessel is to produce a violent turbulence so that the air introduced shall be broken up and disseminated in the pulp as thoroughly, and in as fine a state of division, as possible. Above the grid, baffles P may be provided projecting from the walls of the vessel so as to bring the liquid to a state of comparative rest. The air may be introduced owing to the action of the agitator or the air may be introduced under a pressure sufficient to overcome the hydrostatic head of the air in the pipe. The upper part of the vessel J constitutes the spitzkasten, and is provided with launders Q.

In the case of wool-washing effluent, the operation of the apparatus is extremely simple. The effluent is introduced into the vessel J, agitation is commenced and air is admitted simultaneously. In a few minutes a coherent froth, which is charged with the wool-fat, makes its appearance at the upper outlet of the vessel and so long as the froth is charged with wool-fat it can readily be overflowed by regulating the amount of air introduced into the vessel. When the flotation of the wool-fat is completed, the nature of the froth becomes completely changed. In continuous operation, however, several vessels may be used in series and the introduction and removal of the liquor may be continuous.

Certain emulsions which it may be desired to treat are unsuitable for direct treatment; for example they may be too viscous. It is within the scope of this invention to modify such emulsions to render them suitable, for example to render them sufficiently fluid, for the agitation and aeration treatment, by the addition of water, dilute alkali solution, dilute acid solution or other suitable liquid.

What we claim as our invention and desire to secure by Letters Patent is:—

1. The process of separating the constituents of an emulsion which consists in agitating and aerating the emulsion under such conditions that there are formed therein a multitude of the minute bubbles characteristic of the froth-flotation separation process so as to form a froth preferentially carrying one constituent of the emulsion, and separating the froth.

2. The process of separating the constituents of an emulsion which consists in agitating and aerating the emulsion with an added frothing agent under such conditions that there are formed therein a multitude of the minute bubbles characteristic of the froth-flotation separation process so as to form a froth preferentially carrying one constituent of the emulsion, and separating the froth.

3. The process of separating the constituents of an emulsion which consists in mechanically agitating the emulsion to aerate it with a multitude of the minute bubbles characteristic of the froth-flotation separation process, introducing the agitated and aerated emulsion into a zone of comparative rest to permit the bubbles to rise to form a froth, and separating the froth.

4. The process of separating wool-fat from wool-washing effluent which consists in agitating and aerating the effluent under such conditions that there are formed therein a multitude of the minute bubbles characteristic of the froth-flotation separation process so as to form a froth preferentially carrying the wool-fat, and separating the froth.

5. The process of separating wool-fat from wool-washing effluent which consists in agitating and aerating the effluent in the presence of soap under such conditions that there are formed therein a multitude of the minute bubbles characteristic of the froth-flotation separation process so as to form a froth preferentially carrying the wool-fat, and separating the froth.

6. The process of separating wool-fat from wool-washing effluent which consists in mechanically agitating the effluent to aerate it with a multitude of the minute bubbles characteristic of the froth-flotation separation process, introducing the agitated and aerated effluent into a zone of comparative rest to permit the bubbles to rise to form a froth preferentially carrying the wool-fat, and separating the froth.

7. The process of separating the constituents of an emulsion which consists in agitating and aerating the emulsion with a substance useful in froth-flotation separation under such conditions that there are formed therein a multitude of the minute bubbles characteristic of the froth-flotation separation process so as to form a froth preferentially carrying one constituent of the emulsion, and separating the froth.

8. The process of separating the constituents of an emulsion which consists in agitating and aerating the emulsion with a soluble substance useful in froth-flotation separation under such conditions that there are formed therein a multitude of the minute bubbles characteristic of the froth-flotatation separation process so as to form a froth preferentially carrying one constituent of the emulsion, and separating the froth.

In testimony whereof we have signed our names to this specification in the presence of two subscribing witnesses.

WALTER BROADBRIDGE.
EDWIN EDSER.

Witnesses:
ERIC WINDSOR,
HAROLD CHARLES HANKINS.